(12) United States Patent
Prince et al.

(10) Patent No.: US 7,226,015 B1
(45) Date of Patent: *Jun. 5, 2007

(54) AIRCRAFT AND MISSILE FOREBODY FLOW CONTROL DEVICE AND METHOD OF CONTROLLING FLOW

(75) Inventors: Troy Prince, Cleveland, OH (US);
Frederick J. Lisy, Euclid, OH (US);
Mehul P. Patel, Streetsboro, OH (US);
Jack M. DiCocco, Broadview Heights, OH (US); Reed Carver, Aurora, OH (US); Robert N. Schmidt, Cleveland, OH (US)

(73) Assignee: Orbital Research Inc, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/766,225

(22) Filed: Jan. 28, 2004

Related U.S. Application Data (63) Continuation of application No. 10/336,117, filed on Jan. 3, 2003, now Pat. No. 6,685,143.

(51) Int. Cl.
*B64C 5/10* (2006.01)
*B64C 21/00* (2006.01)

(52) U.S. Cl. ............... 244/3.21; 244/203; 244/198

(58) Field of Classification Search ............... 244/203, 244/75 R, 199, 3.21–3.24, 130, 198, 201, 244/204
See application file for complete search history.

(56) References Cited

U.S. PATENT DOCUMENTS 3,014,675 A 12/1961 Lewis

| | | | |
|---|---|---|---|
| 4,377,982 A | | 3/1983 | Gongwer |
| 4,786,009 A | * | 11/1988 | Rao et al. ................. 244/75 R |
| 4,917,333 A | * | 4/1990 | Murri ........................ 244/75 R |
| 4,989,810 A | * | 2/1991 | Meier et al. ................. 244/208 |
| 5,139,215 A | * | 8/1992 | Peckham ................... 244/3.21 |
| 5,201,829 A | * | 4/1993 | Peters, Jr. ................. 244/75 R |
| 5,319,608 A | * | 6/1994 | Katz ............................. 367/1 |
| 5,322,243 A | * | 6/1994 | Stoy ........................... 244/3.24 |
| 5,326,050 A | * | 7/1994 | Zell ......................... 244/75 R |
| 5,598,990 A | * | 2/1997 | Farokhi et al. ............. 244/199 |

(Continued)

OTHER PUBLICATIONS

.Patel et alz Deployable Flow Effectors for Phantom Yaw Control of Missiles at High Alpha; Ist AIAA Flow Control confe/ence Jun. 24-26, 2002, St. Louis, MO; pp. 1-12.*

(Continued)

*Primary Examiner*—Robert P. Swiatek
(74) *Attorney, Agent, or Firm*—Brian Kolkowski (57) ABSTRACT

The present invention relates to a forebody flow control system and more particularly to aircraft or missile flow control system for enhanced maneuverability and stabilization at high angles of attack. The present invention further relates to a method of operating the flow control system.

In one embodiment, the present invention includes a missile or aircraft comprising an afterbody and a forebody; at least one deployable flow effector on the missile or aircraft forebody; at least one sensors each having a signal, the at least one sensor being positioned to detect flow separation on the missile or aircraft forebody; and a closed loop control system; wherein the closed loop control system is used for activating and deactivating the at least one deployable flow effector based on at least in part the signal of the at least one sensor.

14 Claims, 4 Drawing Sheets

U.S. PATENT DOCUMENTS

| | | | |
|---|---|---|---|
| 5,755,408 A * | 5/1998 | Schmidt et al. ............. | 244/199 |
| 5,794,887 A * | 8/1998 | Komerath et al. ........ | 244/75 R |
| 6,105,904 A * | 8/2000 | Lisy et al. ................. | 244/199 |
| 6,283,407 B1 * | 9/2001 | Hakenesch ................. | 244/3.21 |
| 6,502,785 B1 | 1/2003 | Teter et al. | |
| 6,796,532 B2 * | 9/2004 | Malmuth et al. ........... | 244/204 |
| 6,837,465 B2 * | 1/2005 | Lisy et al. ............... | 244/204.1 |
| 6,866,233 B2 * | 3/2005 | Patel et al. ................. | 244/204 |
| 7,070,144 B1 * | 7/2006 | DiCocco et al. ........... | 244/3.21 |

OTHER PUBLICATIONS

.IBernhardt et al, Closed Löop Control of Forebody Asymmetry;. Journal of Aircraft, vol. 27: No. 3; May-Iune; pp. 491-493.*

LisaBjarka et al; A Summary of the Forebody High-Angle-of Attac Aerodynamic Research on the F-18 and the x-29A Aircraft; Nasa Technical Memorandum: Nov. 1992: pp. 1-17.*

M.D. Fisher et al; Forebody Flow Visualization on the'F-18 HARV With Actuated Forebody Straies; Nasa Technical Memorandumz Sep. 1998 ; pp. 1-I.*

.L Ericson et al.; Forebody Flow Control at C16 . Occurring Separation Asymmetry; J of Aircraft? Mar.-Apr. 2002:252-61.*

G.L.Ericson et aliAsymmetric Flow Separation and Vortex Shedding' on Bod. of Rev.iFrom Tactical Missile Aerodynamics; Edited by M. Hemsch; vol. 141, Chapter 10: 1989: pp. 391-401.*

* cited by examiner

AIRCRAFT AND MISSILE FOREBODY FLOW CONTROL DEVICE AND METHOD OF CONTROLLING FLOW

CROSS-REFERENCE TO RELATED APPLICATIONS

This application is a continuation of U.S. patent application Ser. No. 10/336,117 filed Jan. 3, 2003, now U.S. Pat. No. 6,685,143.

STATEMENT REGARDING FEDERALLY-SPONSORED RESEARCH

The U.S. Government has a paid-up license in this invention and the right in limited circumstances to require the patent owner to license others on reasonable terms provided for by the terms of grant numbers F33615-98-C-3006 and F33615-99-C-3008 awarded by the Department of Defense, Air Force Research Laboratories (AFRL) at Wright Patterson Air Force Base.

BACKGROUND OF THE INVENTION

1. Field of the Invention

The present invention relates to a forebody flow control system and more particularly to aircraft or missile flow control system for enhanced maneuverability and stabilization at high angles of attack. The present invention further relates to a method of operating the flow control system.

2. Technical Background

In numerous aeronautical applications it is desirable to control the flow across a surface. As fluid flows over a flow surface, like air over an aircraft or a missile fore body, it forms a fluid boundary layer at the surface. The fluid boundary layer is a thin layer of viscous flow exhibiting certain pressure variations that affect the operation of the aircraft or a missile.

One of these variations is the separation and vortex induced phantom yaw caused by asymmetric vortex shedding on an aircraft or a missile at high angles of attack, even at zero angle of sideslip of. Large forces and dynamic out-of-plane loading on the aircraft or missile occur at angles of attack ranging from 30 to 60 degrees. It is known that the out-of-plane loading results from micro-asymmetries on the surface of the nose of the aircraft or missile such as dents, cracks in the paint and other microscopic imperfections near the tip of the nose. It has also been known that these asymmetries are affected by the bluntness of the forebody, Reynolds Number; roll angle, and the angle of attack. At high angles of attack, these side forces (yaw) are especially pronounced due to ineffectiveness of the traditional flight control surfaces. Side forces resulting from these asymmetries adversely affect the missile or aircraft's performance and significantly limit their flight envelope.

The demand for better control of missiles or aircraft at high angles of attack has led to a number of approaches for control of these side forces. Flow control devices have been employed to control and counteract these side forces. These flow control devices are either passive or active. Passive flow control devices have included geometric changes to the forebody structure such as nose bluntness, strakes, boundary layer strips, vane vortex generators and rotating nose tips to control the asymmetric vortices off the forebody. These passive flow control techniques are effective to some extent in alleviating these side forces, but at the same time limit the performance of the aircraft or missile by increasing the drag.

Active flow control devices have included jet blowing, unsteady bleed, suction, blowing and deployable flow effectors to control the asymmetric vortices off the fore body. These active flow control techniques are (as with passive devices) also effective to some extent in alleviating these side forces, but also not optimized (as with passive devices), because they operate in an open-loop mode with no sensor feedback, at the same time limit the performance of the aircraft or missile by increasing the drag.

In view of the foregoing disadvantages with presently available passive or active flow control systems and methods for controlling flow asymmetries on a missile or an aircraft, it has become desirable to develop a missile or aircraft forebody flow control system that controls both the magnitude and direction of these side forces (and further the aircraft or missile maneuverability), and can be deactivated when not required in order to reduce drag.

SUMMARY OF THE INVENTION

The present invention relates to a forebody flow control system and more particularly to aircraft or missile flow control system for enhanced maneuverability and stabilization at high angles of attack. The present invention further relates to a method of operating the flow control system.

In one embodiment, the present invention includes a missile or aircraft comprising an afterbody and a forebody; at least one deployable flow effector on the missile or aircraft forebody; at least one sensors each having a signal, the at least one sensor being positioned to detect flow separation on the missile or aircraft forebody; and a closed loop control system; wherein the closed loop control system is used for activating and deactivating the at least one deployable flow effector based on at least in part the signal of the at least one sensor.

In another embodiment, the present invention includes a flow control system for a missile or aircraft forebody comprising at least one activatable flow effectors; at least one sensor having a signal, the at least one sensor being positioned to detect flow separation on the missile or aircraft forebody; an inertial measurement unit having an output; and a closed loop control system; wherein the closed loop control system is used for activating and deactivating the at least one flow effector based on at least in part the signal of the at least one sensor and the output of the inertial measurement unit.

In still another embodiment, the present invention includes a method of stabilization for a missile or aircraft forebody comprising the steps of estimating or determining side forces on a missile or an aircraft forebody based at least in part on a signal from at least one sensor, the at least one sensor being positioned to detect flow separation on the missile or aircraft forebody; the missile or aircraft forebody further comprising at least one flow effector and a closed loop control system for controlling the flow effectors; activating the at least one flow effectors to counteract the side forces by oscillation of the at least one flow effector with the closed loop controller based on at least in part the signal of the at least sensor; and re-estimating or determining side forces on the missile or aircraft forebody based at least in part on a signal from the at least one sensor; and deactivating the at least one flow effector in response to reduced or changed side forces.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3. a) Perspective view of one embodiment of the forebody section of a missile or aircraft having flow effectors and sensors mounted therein; b) Sectional view of forebody along plane A-A' shown in FIG. 3a).

DESCRIPTION OF THE PREFERRED EMBODIMENT

The present invention relates to a forebody flow control system and more particularly to aircraft or missile flow control system for enhanced maneuverability and stabilization preferably at high angles of attack. The forebody of the missile or aircraft for the present invention is defined as the front half of the length of the missile or aircraft. Preferably, the forebody is the front 25% of the length of the missile or aircraft, and most preferably the forebody is the nose of the missile or aircraft. The nose of the missile or aircraft is the cone shaped leading edge. The activatable flow effectors of the present invention include but are not limited to active vortex generators, which are deployable or create pressure active regions by suction or air pressure. The present invention further relates to a method of operating the flow control system.

The flow control system for stabilization and maneuverability of the missile or aircraft forebody relies on the effectiveness of the activatable flow effectors in generating on-demand side forces around the missile or aircraft forebody to create the desired stabilization or maneuverability effect. The activatable flow effectors of the present invention are active micro-vortex generators that effectively control the pressure distribution along the forebody of the missile or aircraft, yielding large side forces and yawing moment for control of yaw on either side of the forebody. The activatable flow effectors of the present invention preferably are deployable flow effectors or other types of micro-vortex generators. Activatable flow effectors of the present invention are flow effectors that are activated to generate fluid flow disturbances in the vicinity of the flow effector, and that can be deactivated when not needed. Preferably, the activatable flow effectors of the present invention can be activated and deactivated at high frequencies. Further preferably, the activatable flow effectors are capable of being cycled at frequencies of at least about 1 Hz, more preferably at frequencies of at least about 20 Hz, even more preferably at frequencies of at least about 60 Hz, and most preferably at frequencies of at least about 100 Hz. Deployable flow effectors are described in more detail in the various embodiments in the Figures below. The frequencies at which the flow effectors of the present invention are cycled may be determined based in part on a number of factors including but not limited to autopilot frequency response characteristics, missile or aircraft dynamics, and missile or aircraft environmental conditions. Some of the other types of flow effectors not shown in the Figures (but described in more detail in U.S. Pat. No. 6,302,360 B1 to Ng which is herein incorporated by reference) include spaced apart valves that are positioned at inlets of a vacuum or pressure chamber, or are connected by pneumatics to a vacuum or pressure source. Preferably, the valves contain a flap that operates to open and close the valves as directed by electrostatic forces. Other valve configurations can also be used. When the valves are opened, the negative pressure from the vacuum chamber or source causes withdrawal of air from the surface of the missile or aircraft forebody through the surface orifices. Therefore, it can be seen that the opening of the valves causes the pressure active region to generate a net inflow of air from the upper flow of air traveling across the surface of the missile or aircraft forebody. This net inflow of air causes a disturbance in the upper flow, resulting in the generation of vortices, which act beneficially to stabilize the airflow around the forebody surface of the missile or aircraft, or to create commanded side forces on the missile or aircraft forebody to improve maneuverability. Similarly, when the valves are open to a positive pressure chamber or source, a net outflow of air is generated resulting in the generation of vortices, which also act beneficially to reattach the air flow to the forebody surface of the missile or aircraft. For purposes of this invention flow effectors include any type of device or article known to those skilled in the art or discovered at a later point that is used to assist in the reattachment of airflow to a missile or aircrafts surface. Preferably, the flow effectors of the present invention are deployable flow effectors. Further preferably, the missile or aircraft of the present invention has at least about 4 activatable flow effectors, more preferably at least about 6 activatable flow effectors and most preferably at least about 8 activatable flow effectors.

Figure 1:
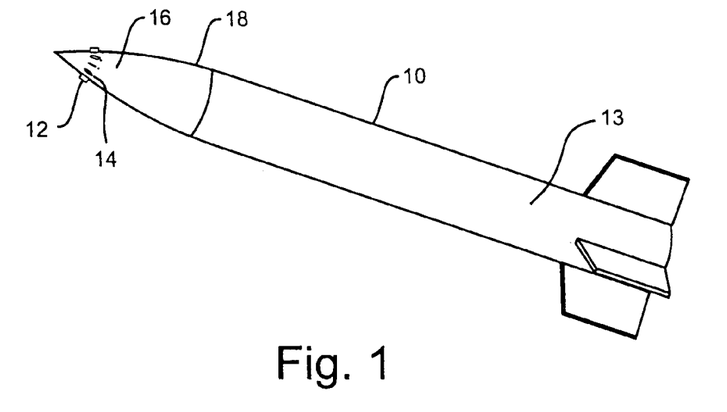
FIG. 1. Schematic view of one embodiment of a missile having a forebody with flow effectors and sensors mounted therein.
Figure 2:
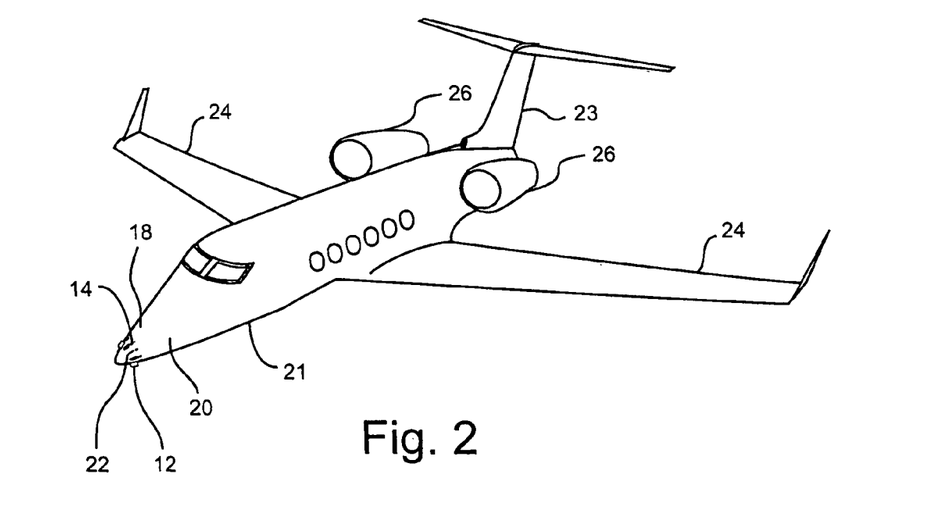
FIG. 2. Schematic view of one embodiment of an aircraft forebody with flow effectors and sensors mounted therein.

Referring now to FIG. 1, there is shown a schematic view of one embodiment of a missile 10 having a forebody 18 and an afterbody 13. The forebody 18 having at least one activatable flow effector 12. The forebody further having at least one sensor 14. The sensor being positioned to detect flow separation from the flow surface 16 on the missile 10 forebody 18. The forebody 18 of this specific embodiment having a number of flow effectors 12 and sensors 14 mounted in the forebody 18 (or nose) therein. Furthermore in this specific embodiment, the individual flow effectors 12 and individual sensors 14 are in close proximity with respect to each other. The fluid boundary layer is a thin layer of viscous flow exhibiting certain pressure variation characteristics and fluid dynamics that affect the operation of the flow surface 16. The fluid is generally air. The flow surface 16 for purposes of the present invention is the forebody of a missile or an aircraft. FIG. 2 is a schematic view of one embodiment of an aircraft 20 adapted with the vortex generating system 22 of the present invention. The airplane can be any type of aircraft, including commercial, military and space vehicles. The aircraft 22 includes a fuselage 21, a tail 23, wings 24, forebody (nose) 18 and jet engines 26. In this specific embodiment, the individual flow effectors 12 and individual sensors 14 are also mounted in close proximity with respect to each other on the forebody 18 of the aircraft 20. Under certain conditions such as high angles of attack, the missile 10 in FIG. 1 and the aircraft 20 in FIG. 2 may experience fluid boundary layer separation.

The sensor(s) of the present invention include but are not limited to a dynamic pressure sensor, shear stress sensor (hot film anemometer, a direct measurement floating-element shear stress sensor), inertial measurement unit or system, and other sensors known to those skilled in the art whose signal could be used to estimate or determine flow separation on the surface of the missile or aircraft. The sensors of the present invention are used to determine or estimate flow separation. An inertial measurement unit for example is a sensor, which would not directly measure flow separation, but could be used to estimate or predict separation. The preferred sensor of the present invention is a pressure sensor. The pressure sensor is used to sense flow separation. The pressure sensor can be any type of sensor suitable for measuring the pressure at the flow surface. The pressure sensor can for example be a piezoelectric device, which generates an electric signal in response to a sensed pressure, a shape memory alloy device, or any other pressure sensor or transducer known to those skilled in the art. Preferably, the ratio of flow effectors to sensors is less than about 3:1, more preferably less than or equal to 2:1, and most preferably less than or equal to 1:1. The higher the concentration of pressure sensors to flow effectors the more redundancy can be built into the system utilizing the present invention. Most preferably the sensor is a flush, surface mounted diaphragm type pressure sensor. The at least one sensor 14 having a signal which is used at least in part by a controller (not shown) to activate and deactivate the at least one flow effector 12.

In addition to flow separation sensors, various embodiments of the present invention may also include a means for determining the relative spatial orientation of the flow effectors and/or sensors with respect the flow separation on the missile or aircraft body. This means would include utilizing the output of an inertial measurement unit and other systems, which could be used to determine the missile or aircraft orientation with respect to this flow separation. An inertial measurement unit provides six-degree-of-freedom motion sensing for applications such as navigation and control systems. Angular rate and acceleration are measured about three orthogonal axes.

Figure 3:
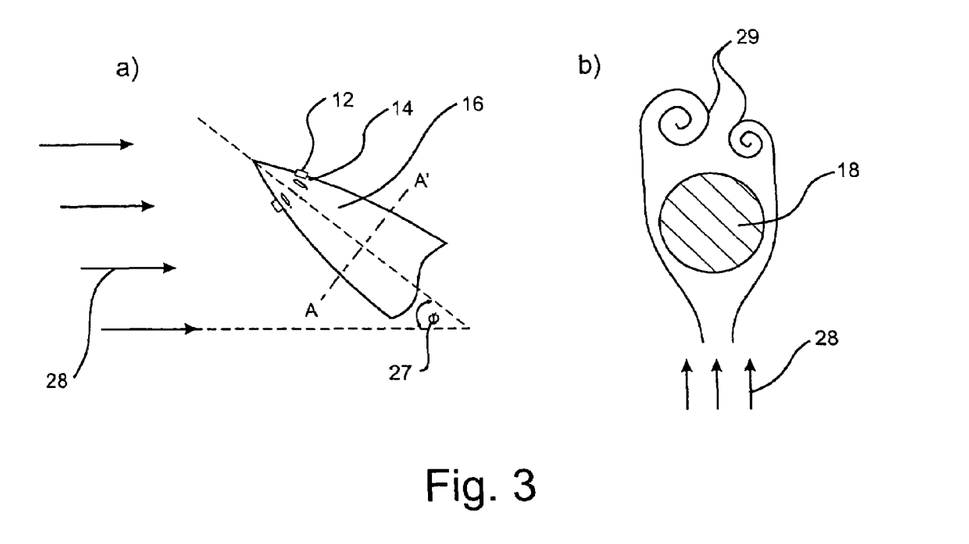

FIG. 3a) is a perspective view of one embodiment of the forebody section of a missile or aircraft having activatable flow effectors 12 and sensors 14 mounted therein. The missile or aircraft forebody of the present invention can be designed with asymmetries in the forebody (not shown) to provide to better stability or control with the present flow control system. Boundary layer separation at the missile or aircraft forebody is caused by a combination of the viscous forces within the fluid boundary layer and an adverse pressure gradient over the flow surface 16. Controlling fluid boundary layer dynamics not only provides an overall benefit to the operation of the flow surface but also counteracts and controls fluid boundary layer separation. Due to the geometrically slender body or micro-asymmetries at the nose of a missile or an aircraft, boundary layer flow separation of the fluid flow 28 at the flow surface 16 at high angles of attack 27 may result in large side forces and dynamic out-of-plane loading resulting in a yawing moment of a missile or an aircraft. In other words, at high angles of attack (>15°) of the forebody of an aircraft or missile there may be some degree of asymmetric vortex shedding. Asymmetric vortex shedding is caused by fluid passing over the missile or aircraft and separating on one-side of the missile or aircraft prior to separation on the other (or to a greater extent). One of the objects of the present invention is to stabilize, control and/or create side forces to improve the stability and maneuverability of a missile or an aircraft. High angles of attack 27 are represented by theta ($\Phi$) 27. High angles of attack are preferably a theta ($\Phi$) 27 of at least about 20°, and more preferably a theta ($\Phi$) from about 30° to about 60°. FIG. 3b) is a sectional view of section A-A' of a missile or aircraft forebody 18 as shown in FIG. 3a). FIG. 3b) shows the fluid flow 28 around a missile or aircraft forebody 18 at a section A-A' in the proximity of the activatable flow effectors 12, and the resultant flow separation prior to activation of the flow effectors 12.

Figure 4:
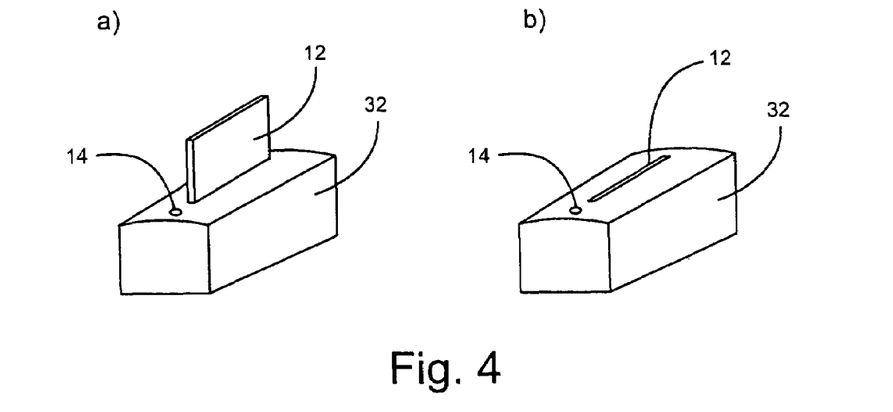
FIG. 4. Perspective view of one embodiment of a module containing a co-located sensor, and a) a deployable flow effector (deployed) and b) a deployable flow effector (retracted).

In FIG. 4, there is shown a perspective view of one embodiment of a module containing a co-located sensor, and a) an activatable, deployable flow effector (deployed) and b) an activatable, deployable flow effector (retracted). In this particular embodiment, the module 32 contains an activatable, deployable flow effector 12 and a pressure sensor 14. The activatable, deployable flow effector 12 being capable of being deployed into and retracted from, respectively, the fluid boundary layer flowing over the flow surface of the missile or aircraft forebody wherein the module 32 is employed. The deploying and retracting can be accomplished using any device such as pneumatic pressure, hydraulic pressure, vacuum, a mechanical device such as a solenoid valve, a microelectromechanical device, any combination thereof or the like. The module 32 may or may not include a controller (not shown) internal to the module. The pressure sensor 14 is connected to the controller (not shown). If the controller (not shown) is not internal to the module 32 then the module 32 preferably further comprises a link between pressure sensor 14 and the controller, and another link between the controller (not shown) and deploying means (not shown). The controller (not shown) is programmed to operate the deploying and retracting means in response to specific pressure conditions sensed at the flow surface 16. The controller (not shown) can be any device such as a computer, suitable for gathering information from the pressure sensors 14, and directing the activation of the activatable flow effectors 12. Where a number of activatable flow effectors 12 and/or pressure sensors 14 (or modules 32) are employed, the controller (or controllers) (not shown) can be programmed and connected to integrate each of the activatable flow effectors 12, pressure sensors 14 and modules 32 so that the output from all of the regions will be coordinated to enhance and possibly optimize the stabilization and maneuverability of a missile or an aircraft forebody. Specific patterns of deployment and/or retraction of the flow effectors 12 can be determined to handle a variety of routine events and also incorporated into the control scheme.

Figure 5:
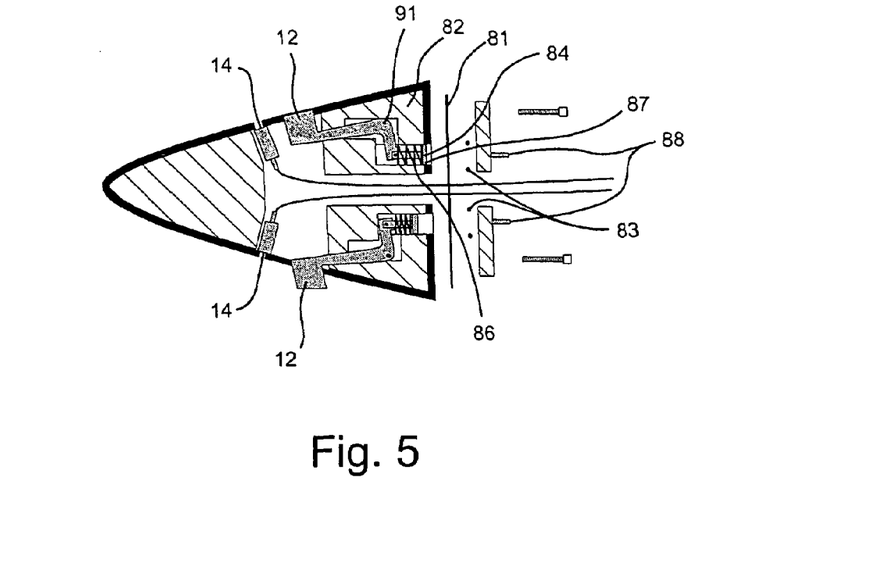
FIG. 5. Sectional view of one embodiment of the forebody section of a missile or aircraft having flow effectors and sensors mounted therein.

FIG. 5 is a sectional view of one embodiment of the forebody (nose) section of a missile or aircraft having a flow effector 12 and sensor 14 mounted therein. In FIG. 5, the two activatable flow effectors 12 shown in this cross-section are movably attached by an attachment means, i.e., a hinge 91, to a base structure 82. The activatable flow effectors 12 are deployable flow effectors. The activatable flow effectors 12 are further movably attached to a piston 84. The piston 84 moves within a cylinder 86 in response to a pressure source (not shown) applied via a pneumatic system (not shown) against an elastomeric sheet 81 to move the pistons 84 and in return to deploy and retract the flow effectors 12. The piston 84 also is connected to a biasing means 87, i.e., a spring, to return the piston 84 to its original position upon removing the pressure source, and therefore retracting the deployable flow effector 12. In this particular embodiment, the pressure is applied to the piston 84 via a pressure inlet/outlet 88. Also shown in this particular embodiment are seals in the form of O-rings 83 to seal the pneumatic system (not shown) of the pressure source (not shown); and two sensors 14. The sensors 14 are connected via leads to a controller (not shown). The pressure source (not shown) is also connected to the controller (not shown).

Figure 6:
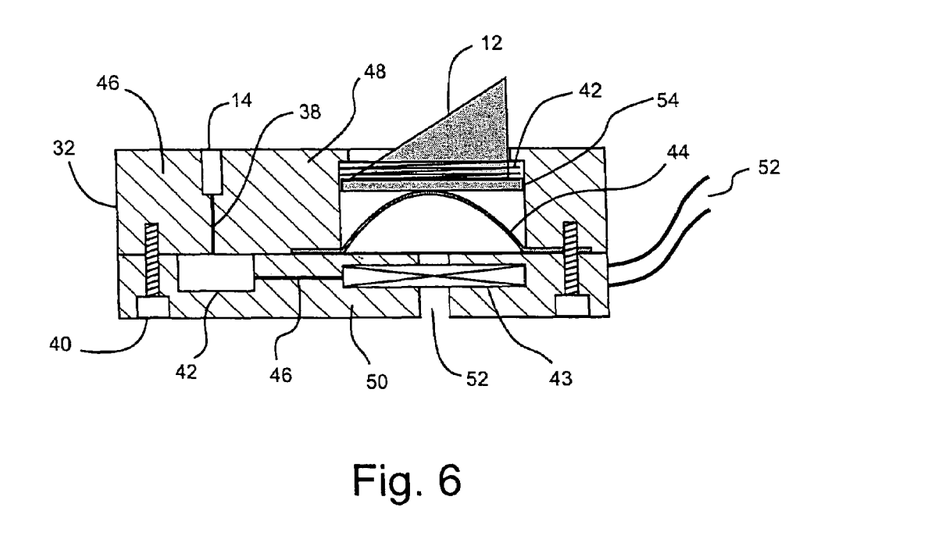
FIG. 6. Sectional view of one embodiment of a deployable flow effector.

FIG. 6 is a sectional, detailed view of a module 32 (as shown in FIG. 4) with an activatable deployed flow effector 12. In FIG. 6, the flow effector 12 is movably attached to the upper portion 48 of the housing 46 of the module 32 and is attached to the lower portion 50 of the housing 46 of the module 32 by at least two fasteners 40. The upper portion 48 of the housing 46 mates with the lower portion 50 with a sealing ring (not shown) and a sealable, flexible element 44 there between. The flow effector 12 is deployed by pressure being applied to the flexible element 44. The flow effector 12 has a biasing means (a spring) 42 which attaches at one end to the upper portion 48 of the housing 46 and at the other end to the base 54 of flow effector 12. Directly beneath the flow effector 12 is a valve 43, which opens and closes to allow for the application of fluid or gas pressure from a pressure source not shown to be applied to the flexible element 44 through a pneumatic pathway 52. A pressure sensor 14 senses fluid flow at or near the surface over which the fluid is flowing. Preferably the pressure sensor at the surface of the airfoil, and most preferably it is flush with such surface. The pressure sensor 14 can be any pressure sensor but advantageously is a microelectromechanical (MEMS) based or piezoelectric based sensor. The sensor transmits a signal, in this case a voltage but it is understood to one skilled in the art that the signal can be other than voltage, including, but not limited to, current, pressure, hydraulic or optical. The signal corresponds to the pressure it senses.

The pressure sensor 14 is connected to a controller 42 internal to the module 12 (or optionally external to the module). The controller 42 can be for example a proportional-integral-derivative (PID) controller, an adaptive predictive controller, or an adaptive predictive feedback controller. The controller of the present invention is preferably a closed loop control system. The controller can be used to minimize side forces or to create commanded side forces on the missile or aircraft forebody. The pressure sensor transmits a signal to the controller 42 through the electrical connection 38 (in practical application, multiple pressure sensors 14 send multiple signals to the controller 42). The controller 42 processes the signals to determine, through mathematical modeling, the dynamics of the flow surface. Such dynamics include boundary layer separation and stall. It is the predictive ability of the controller 42, which provides for this function and expands this system from being merely responsive. This is especially advantageous for dynamic systems, which are nonlinear and time varying and operating in challenging environments. The controller 42 produces an output signal to a monitor, recorder, alarm and/or any peripheral device for alarming, monitoring, or in some manner, affecting or precluding the dynamics upon its incipience. Advantageously, the controller 42 is the ORICA™ controller, an extended horizon, adaptive, predictive controller, produced by Orbital Research, Inc. and patented under U.S. Pat. No. 5,424,942, which is incorporated herein by reference. Under certain conditions, the controller 42 (or optionally an external controller) which is connected via electrical connection 46 to the valve 43 causes the valve 43 to open thereby resulting in the deployment of the flow effector(s) 12. Preferably, the pressure source (or other deployment and/or retraction means) is internal to the module 12. The sealable, flexible element 44 referred to above can be made of a single polymer or a combination of polymers. The pressure source can be air bled from an aircraft turbine engine, a pressurized gas cartridge, or pressurized fluid. The biasing means is employed to urge the sealable, flexible element 44 towards its quiescent state after pressure is removed or reduced. The biasing means can be any device or spring like means, such as vacuum or pressure, mechanical or electromechanical device.

Figure 7:
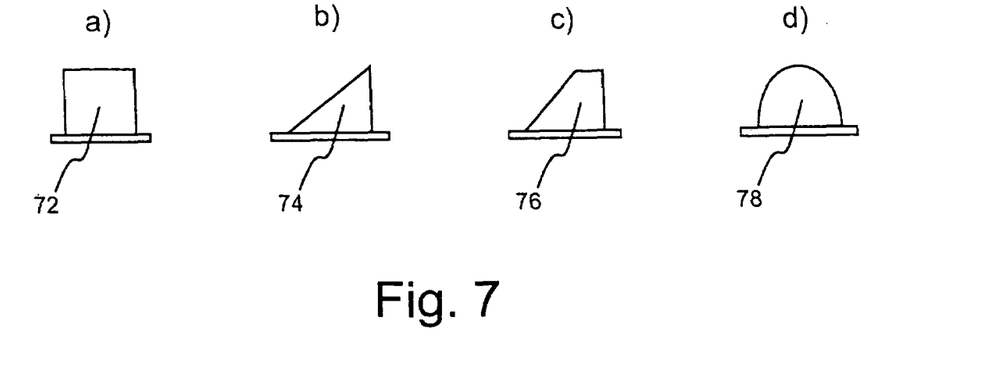
FIG. 7. Sectional view of deployable flow effector shapes.

The deployable portion of the activatable, deployable flow effectors shown in the previous Figures are small mechanical tabs preferably made from epoxy glass-fabric, and deactivate to assume a position underneath the skin surface of the missile or aircraft in their retracted state. Several examples of various embodiments of the flow effectors are shown in FIG. 7 *a, b, c* and *d*. These cross-sectional views demonstrate that rectangular 72, triangular 74, irregular 76, semi-circular 78, and square not shown can be used. The present invention is, however, not limited to these shapes and it is envisioned that any shape of flow effector known presently or conceived of in the future by those skilled in the art may be used. Upon controlled activation, the flow effectors (deployable or other) manipulate the forebody of the missile or aircraft's vortical flow field to generate the desired side forces or yawing moment. Single flow effectors or combinations of flow effectors can be activated either statically or cycled at a varying frequency (oscillated) to obtain a desired side force or yawing moment. Varying frequency or oscillation of the flow effectors includes but is not limited to pulse width modulation or other techniques known to those skilled in the art.

Figure 8:
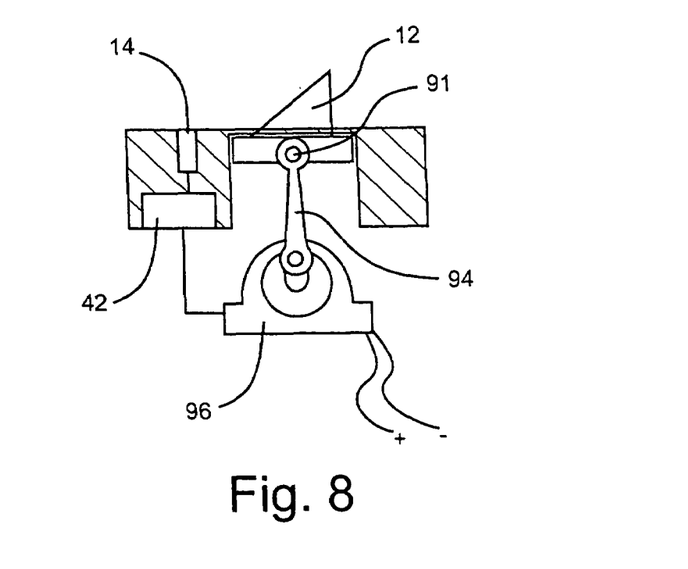
FIG. 8. Sectional view of another embodiment of a deployable flow effector.

FIG. 8 is a sectional view of another embodiment of a deployable flow effector. In FIG. 7, the activatable flow effectors 12 are deployable flow effectors. The flow effectors 12 are further movably attached to a camshaft 94. The camshaft 94 moves in response to an electric motor 96 to deploy and retract the flow effector 12. The motor is connected to a controller 42. The controller 42 activates and deactivates the deployable flow effector in response to at least in part the signal from the sensor 14.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A missile or aircraft comprising
   a. an afterbody and a forebody;
   b. at least one flow effector on the missile or aircraft forebody;
   c. at least one sensor each having a signal, the at least one sensor being positioned to detect flow separation or side forces on the missile or aircraft forebody; and d. a closed loop control system;
wherein the closed loop control system activates and deactivates the at least one flow effector based on at least in part the signal of the at least one sensor to create commanded side forces on the missile or aircraft forebody.

2. A flow control system for a missile or aircraft forebody comprising
   a. at least one flow effector;
   b. at least one sensor having a signal, the at least one sensor being positioned to detect flow separation or side forces on the missile or aircraft forebody;
   c. an inertial measurement unit having an output; and
   d. a closed loop control system;
wherein the closed loop control system is used for activating and deactivating the at least one flow effector based on at least in part the signal of the at least one sensor and the output of the inertial measurement unit.

3. The flow control system in claim 2, comprising at least four flow effectors.

4. The flow control system in claim 2, comprising at least six flow effectors wherein the at least six flow effectors are positioned and separated substantially equi-distantly about a center of the forebody of the missile or aircraft.

5. The flow control system in claim 2, wherein the flow effector is capable of being activated and deactivated at frequencies of at least 1 Hz.

6. The flow control system in claim 2, wherein the flow effector is capable of being activated and deactivated at frequencies of at least 20 Hz.

7. The flow control system in claim 6, wherein the closed loop control system activates and deactivates the at least one flow effector to create additional side forces on the missile or aircraft forebody.

8. The flow control system in claim 2, wherein the closed loop control system activates and deactivates the at least one flow effector to create commanded side forces on the missile or aircraft forebody.

9. A method of maneuvering a missile or aircraft forebody comprising the steps of
   a. estimating or determining side forces on a missile or an aircraft forebody based at least in part on a signal from at least one sensor, the at least one sensor being positioned to estimate or determine side forces on the missile or aircraft forebody; the missile or aircraft forebody further comprising at least one flow effector and a closed loop control system for controlling the at least one flow effector;
   b. activating the at least one flow effector to change the side forces by activation of the at least one flow effector with the closed loop controller based on at least in part the signal of the at least sensor; and
   c. re-estimating or determining side forces on the missile or aircraft forebody based at least in part on a signal from the at least one sensor; and
   d. deactivating the at least one flow effector in response to changed side forces.

10. The method of maneuvering in claim 9, wherein the at least one flow effector is activated by oscillating the at least one flow effector.

11. The method of maneuvering in claim 9, wherein the missile or aircraft forebody comprises at least six flow effectors wherein the at least six flow effectors are positioned and separated substantially equi-distantly about a center of the forebody of the missile or aircraft.

12. The method of maneuvering in claim 9, wherein the forebody of the missile or aircraft is designed with asymmetries in the forebody.

13. The method of maneuvering in claim 9, wherein the at least one flow effector is only activated at angles of attack of the missile or aircraft forebody of between about 20 to about 60 degrees.

14. The method of maneuvering in claim 9, wherein the at least one flow effector is a deployable flow effector.

* * * * *